United States Patent

Batistic

Patent Number: 6,135,576
Date of Patent: Oct. 24, 2000

[54] CONTROL BEHAVIOR OF AN ANTI-LOCKING BRAKE SYSTEM

[75] Inventor: Ivica Batistic, Frankfurt am Main, Germany

[73] Assignee: ITT Manufacturing Enterprises, Inc., Wilmington, Del.

[21] Appl. No.: 09/029,784
[22] PCT Filed: Jul. 3, 1996
[86] PCT No.: PCT/EP96/02911
§ 371 Date: Jun. 1, 1998
§ 102(e) Date: Jun. 1, 1998
[87] PCT Pub. No.: WO97/11868
PCT Pub. Date: Apr. 3, 1997

[30] Foreign Application Priority Data

Sep. 28, 1995 [DE] Germany .......................... 195 36 058

[51] Int. Cl.[7] .................................................. B60T 8/34
[52] U.S. Cl. ...................... 303/113.5; 303/186; 303/9.71
[58] Field of Search ............................. 303/113.5, 170, 303/186, 9.62, 9.71

[56] References Cited

U.S. PATENT DOCUMENTS

| | | | |
|---|---|---|---|
| 4,323,969 | 4/1982 | Skarvada | 303/178 |
| 4,802,711 | 2/1989 | Muto et al. | 303/170 |
| 4,980,831 | 12/1990 | Katayama et al. | 303/170 |
| 4,989,923 | 2/1991 | Lee et al. | 303/173 |
| 5,415,469 | 5/1995 | Poggenburg et al. | 303/186 |
| 5,855,419 | 1/1999 | Urai et al. | 303/186 |

FOREIGN PATENT DOCUMENTS

| | | |
|---|---|---|
| 0276798 | 8/1988 | European Pat. Off. . |
| 0299510 | 1/1989 | European Pat. Off. . |
| 3706663 | 9/1988 | Germany . |
| 4007360 | 9/1991 | Germany . |
| 4009355 | 9/1991 | Germany . |
| 4114346 | 11/1991 | Germany . |
| 4031707 | 4/1992 | Germany . |
| 4122484 | 1/1993 | Germany . |
| 4241844 | 6/1994 | Germany . |
| 4338542 | 5/1995 | Germany . |

*Primary Examiner*—Robert J. Oberleitner
*Assistant Examiner*—Robert A. Siconolfi
*Attorney, Agent, or Firm*—Rader, Rishman & Grauer PLLC

[57] ABSTRACT

To improve the control behavior of an anti-lock control system, in a method wherein the rotational behavior of the wheels is measured and evaluated and a vehicle reference speed, wheel slip data and wheel acceleration data and other control parameters are determined, the lowest wheel speed ($v_{min}$) is continuously compared with the highest wheel speed ($v_{max}$) during a braking operation. In the event of an approximate correlation between the lowest ($v_{min}$) and the highest ($v_{max}$) wheel speed and if the correlation lasts longer than a predefined length of time (T1, T2), the pressure in the brakes of the front wheels is permitted to increase or caused to increase after this length of time. The duration of the predetermined length of time (T1, T2) can be varied as a function of the acceleration or deceleration ($v_3$, $v_4$) of the non-driven wheels.

8 Claims, 3 Drawing Sheets

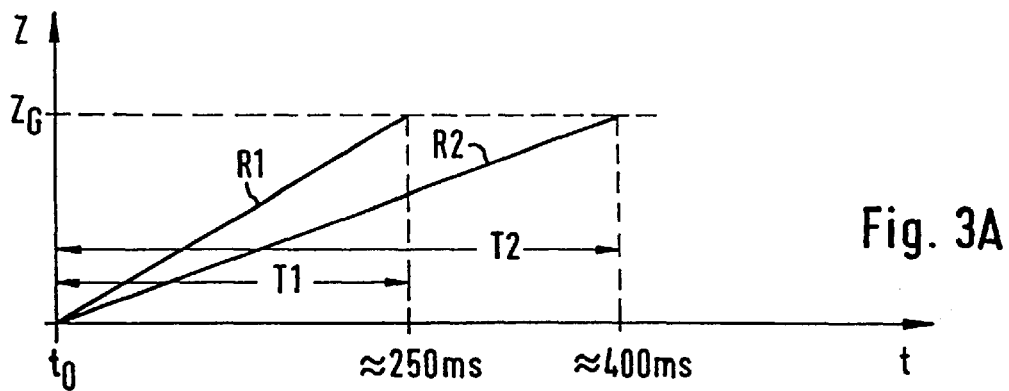
Fig. 3A
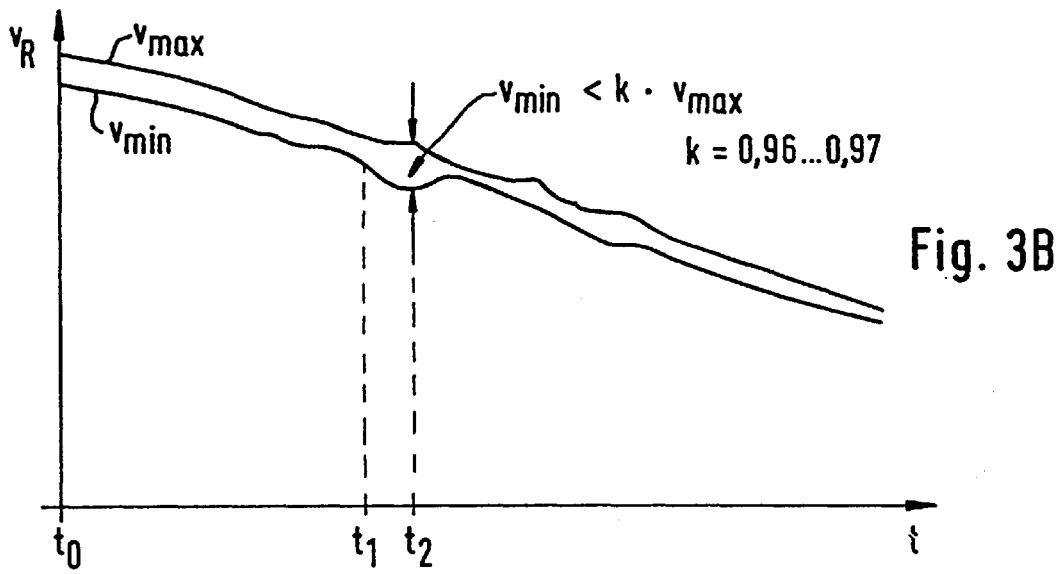
Fig. 3B
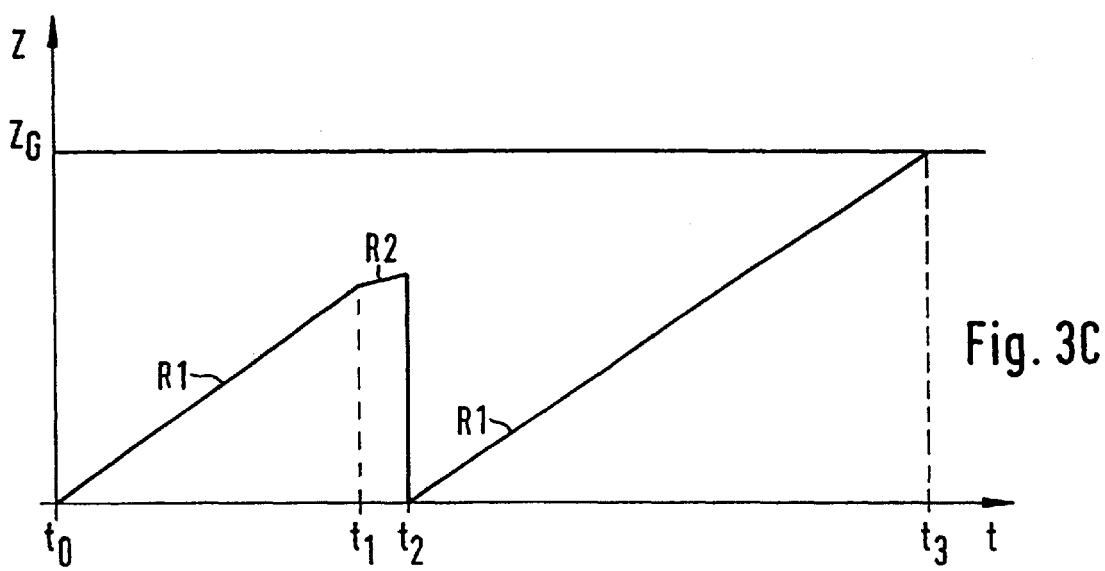
Fig. 3C
Fig. 3

CONTROL BEHAVIOR OF AN ANTI-LOCKING BRAKE SYSTEM

BACKGROUND OF THE INVENTION

The present invention relates to a method of improving the control behavior of a brake system with anti-lock control, wherein the rotational behavior of the wheels is measured and evaluation and logical combining of the wheel rotational speed data permits producing a vehicle reference speed, wheel slip data and wheel acceleration data and other control parameters which are used to proportion and modulate the braking pressure.

Electronically controlled anti-lock brake systems (ABS) have gained in significance in the past years. Systems of this type are on the market in large numbers and various designs. In the majority of systems known in the art, the data required for anti-lock control are produced by measuring the rotational behavior of the vehicle wheels. A vehicle reference speed is determined by logically combining the signals originating from the individual wheels and can be taken into account as a reference quantity to calculate the wheel slip and other control parameters and, in addition, to set and modulate the braking pressure in the wheel brakes of the individual vehicle wheels.

Difficulties are involved in the identification of the actual control situation by way of the data furnished by the wheel sensors and the adjustment or modulation of the braking pressure in terms of an optimal braking behavior when the interpretation of the sensor signals is no absolute indicator of the instantaneous driving and control situation. Further, per se contradicting demands in terms of wheel stability (by pressure relief) and a short stopping distance (by a maximum possible braking pressure) must be satisfied in pressure modulation which is performed by the ABS controller on the basis of the so-called control philosophy, i.e., the predetermined algorithms, in response to the rotational behavior of the individual wheels.

There is a number of situations which are especially difficult to be identified by the ABS controller and which give rise to misinterpretations if no special measures are taken. For example, bumps and other disturbances in the road surface cause vehicle decelerations which are erroneously interpreted as locking tendency by the controller. Therefore, it is appropriate to analyze the rotational behavior of the wheels pursuant criteria of different types in order to discover contradictions and to protect individual control measures, especially those which are critical in terms of safety, according to different aspects and criteria.

An object of the present invention is to identify control situations where the braking pressure adjusted by the control is too low or is below the per se achievable optimum.

SUMMARY OF THE INVENTION

It has been found that this object can be achieved by a method including that the lowest wheel speed is continuously compared with the highest wheel speed during a braking operation, that in the event of a correlation, at least by approximation, between the lowest and the highest wheel speed and if the correlation lasts longer than a predefined time interval, the pressure in the wheel brakes of the front wheels is permitted to increase, or caused to increase directly or indirectly, after this time interval. For example, the braking pressure in the front wheels is increased by opening of the inlet valves which are inserted in the pressure fluid path from the master cylinder of the brake system to the front-wheel brakes. The same effect can be achieved indirectly by rise of the reference speed which is used as a reference quantity for the proportioning of braking pressure.

In a preferred aspect of the present invention, the predefined time interval is varied as a function of the acceleration (or deceleration) of the non-driven vehicle wheels, and the predefined time interval is set to a small value as long as the acceleration of all non-driven wheels is in excess of a predetermined limit value, and is set to a longer duration when the acceleration is lower (or the deceleration is greater). Instead of the two-step method, it is also possible to arrange for several steps, and the duration of the predefined time intervals rises with decreasing acceleration.

The present invention is based on the consideration that a permanent stability of all wheels, i.e., a virtual correlation of the wheel speeds of the wheels, during a controlled braking operation is unusual and can be assessed as an indicator of insufficient braking pressure which is below the optimum. Experience shows that during control of the braking pressure proximate the wheel lock threshold, the brake slip of individual wheels rises to such an extent that the speed variation of the wheel concerned differs relatively greatly from the fastest wheel. This can be identified by constantly comparing the lowest with the highest wheel speed. In the absence of such a discrepancy, or if the correlation lasts longer than a predefined time interval, this is an indicator of insufficient braking pressure. The front-wheel braking pressure is increased directly or indirectly in this situation to improve the control.

For example, counters can be used having count rates which predefine the time intervals, in excess of which braking pressure increase is initiated. These counters are reset as soon as the difference between the lowest wheel speed and the highest wheel speed exceeds a predefined limit value of, for example, 95 to 98% or 96 to 97% of the highest wheel speed.

Further features, advantages and possible applications of the present invention can be seen in the following description of further details making reference to the accompanying drawings.

BRIEF DESCRIPTION OF THE DRAWINGS

In the drawings,

FIG. 3 is a view of diagrams explaining the operation of a circuit of the present invention.

DETAILED DESCRIPTION OF THE DRAWINGS

Figure 1:
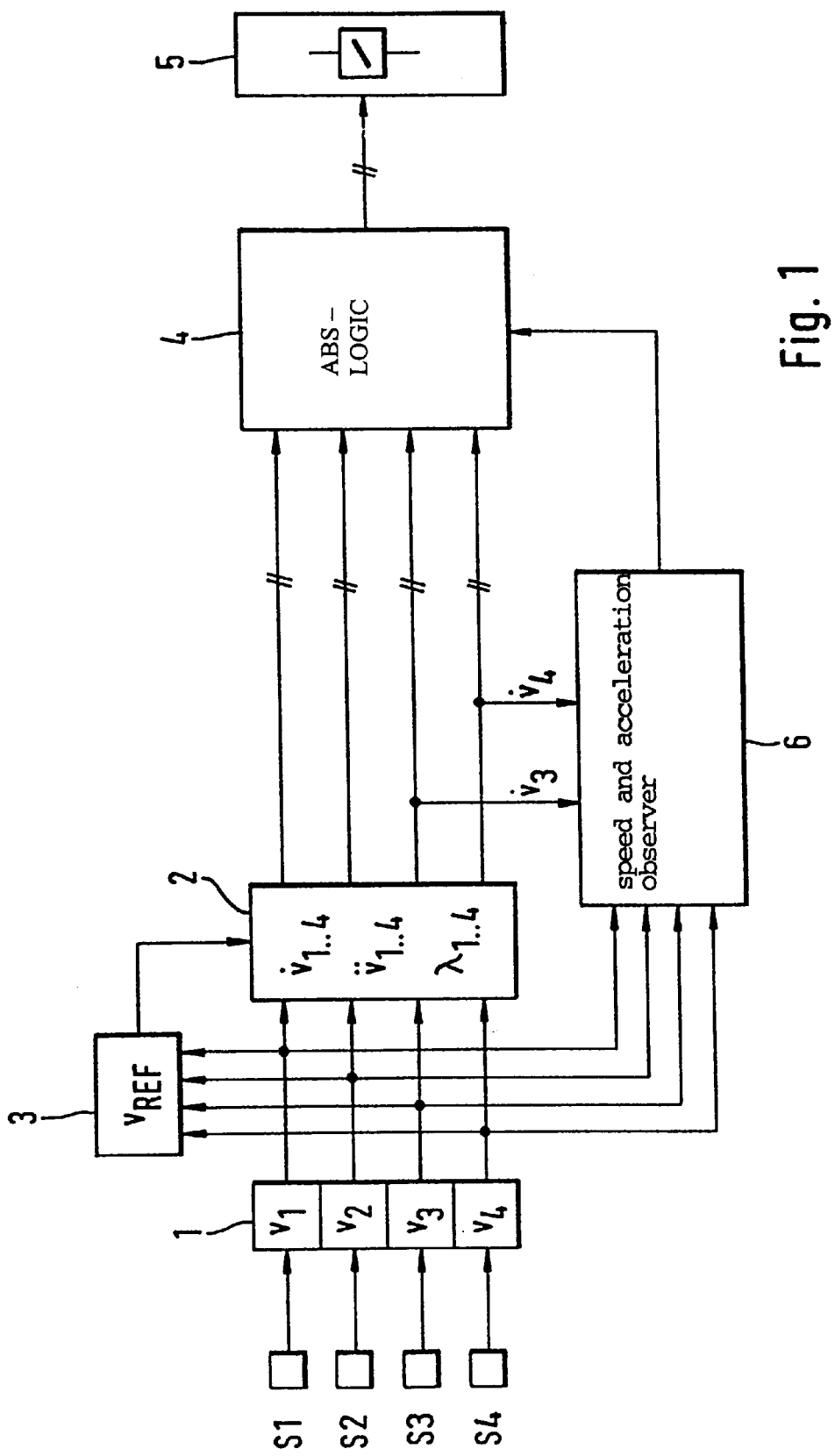
FIG. 1 is a simplified view of the essential components of a circuit for implementing the method of the present invention.

FIG. 1 shows a circuit for an electronically controlled anti-lock system. The input data of the system are produced by way of wheel sensors S1 to S4. In a conditioning circuit 1, wheel speed signals $v_1$ to $v_4$ are produced on the basis of the data of the sensors which are available at the output of circuit 1 either as signals, or in the form of speed data when a data processing system is provided.

In a signal processing circuit 2, the time derivatives of the speed signals $v_1$ to $v_4$ are produced in a known fashion, above all the acceleration signals $\dot{v}_1$ to $\dot{v}_4$, the jerk signals $\ddot{v}_1$ to $\ddot{v}_4$, and the slip signals $\lambda_1$ to $\lambda_4$. A vehicle reference speed $v_{REF}$ representative of the approximate vehicle speed is required to determine the wheel slip $\lambda_1$ to $\lambda_4$.

The data produced by analysis of the sensor signals are sent to an ABS logic 4 which generates braking pressure control signals by comprehensive calculations on the basis of complex algorithms. The pressure control signals control electrically operable hydraulic valves or other actuators permitting adjustment and modulation of the braking pressure in a hydraulic brake system or the brake force. The valve block of a hydraulic brake system is assigned reference numeral 5 in FIG. 1.

The ABS logic 4 is frequently achieved by programmed circuits, i.e., by one or more microcomputers.

The basic circuits or program parts which are required to implement the method of the present invention are incorporated in a speed and acceleration observer 6. This block is supplied with the wheel speeds $v_1$ to $v_4$ and the acceleration signals $v_3$, $v_4$ as inlet signals, the indices 3 and 4 referring to the non-driven wheels.

The lowest wheel speed $v_{min}$ is continuously compared to the highest wheel speed $v_{max}$ in the circuit block 6. The special features of the method of the present invention become effective when the wheel speeds $v_1$ to $v_4$ during a controlled braking operation are very close to each other, or practically hardly differ from each other, for predefined time intervals which are in the order or some 100 msec. If the lowest wheel speed $v_{min}$ is in excess of a predetermined value $k \times v_{max}$ for the duration of the above predefined time intervals, and 'k' ranges between 96 and 97%, for example, this is an indication that the introduced braking pressure might be below the optimal value.

If the lowest wheel speed $v_{min}$ is almost coincident with the highest wheel speed $v_{max}$ for longer than a defined time interval, this condition is signaled to the ABS logic 4 by the circuit 6, with the result that the pressure is increased in the front-wheel brakes. The time of observation or the time interval until the reaction to the approximate correlation of all wheel speeds is a function of the acceleration (a negative acceleration is also termed as 'deceleration') of the non-driven wheels during the braking operation. In a moderate retardation with a wheel acceleration in excess of roughly –0.5 g to –0.7 g (or a deceleration of 0.5 g to 0.7 g), the pressure in the front-wheel brakes is already increased after a relatively short period of 250 msec, for example, while a major retardation in excess of –0.7 g to –1 g requires a longer time of 400 msec, for example, to pass by before the circuit 6 causes braking pressure increase in the front-wheel brakes by way of the ABS logic 4.

Figure 2:
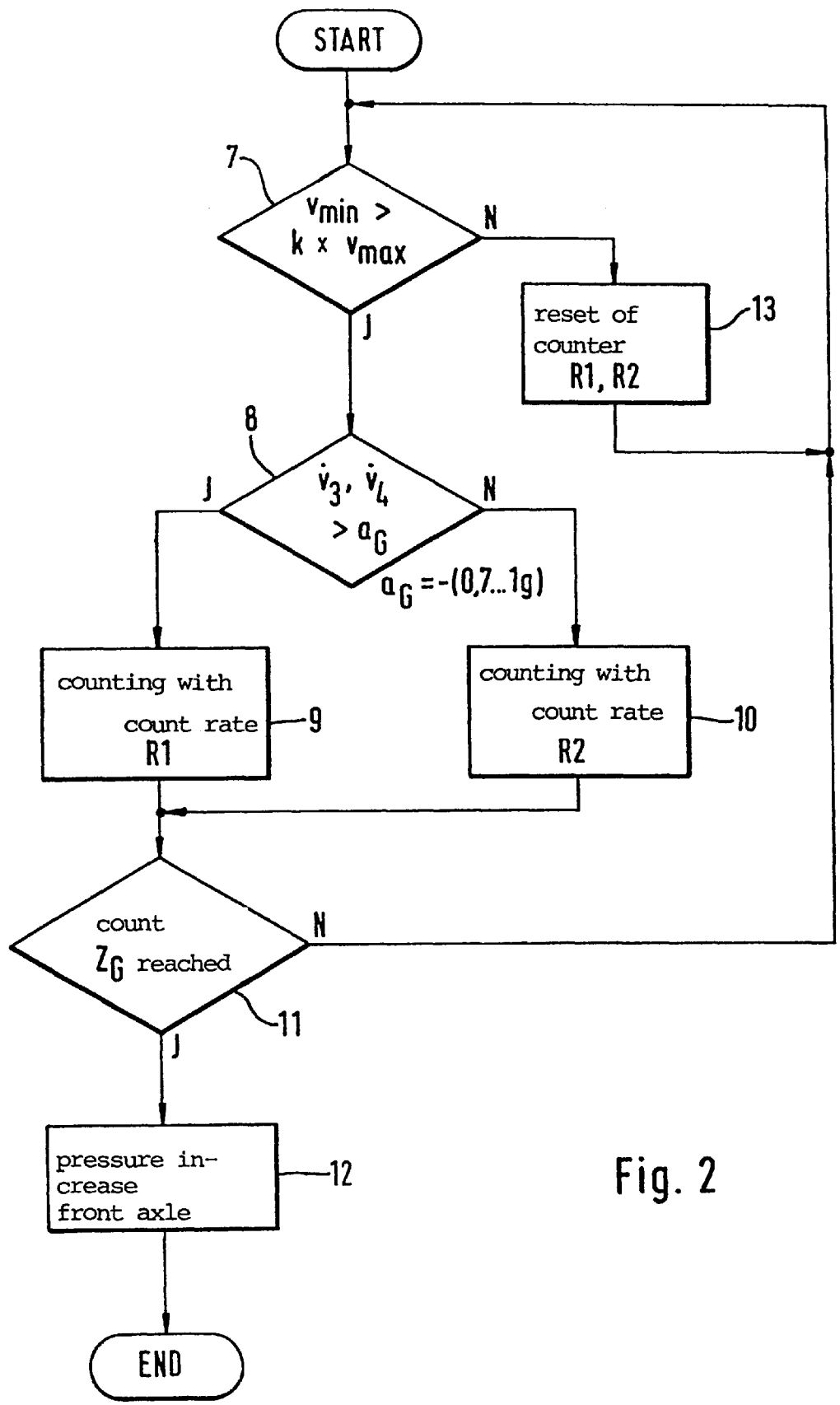
FIG. 2 is a flow chart showing the individual steps in the implementation of the method of the present invention.

The functioning and operation of the speed and acceleration observer 6 is shown in the flow chart of FIG. 2.

After the START of the subroutine in the embodiment of FIG. 2, it is initially determined in the branching 7 whether the relation $$v_{min} > k \times v_{max}, \text{ and } k=0.96 \text{ to } 0.97$$

is satisfied. If yes (i.e., all wheel speeds are very close to each other), a counting action with a count rate R1 or R2 is triggered which corresponds to the predetermined time interval. As soon as a count $Z_G$ is reached (branching 11), the braking pressure in the front-wheel brakes is increased in step 12. This increase is achieved either by directly actuating and opening inlet valves, which are generally inserted in the pressure fluid paths extending to the front-wheel brakes, or by rise of the vehicle reference speed.

The time interval until the commencement of the braking pressure introduction is predetermined by presetting the count rate R1 (program part 9) or the count rate R2 (program part 10), namely, depending on the magnitude queried in branching 8 by which the non-driven wheels (wheels 3, 4) are accelerated or decelerated. With a moderate acceleration which exceeds an acceleration limit value, i.e., $$v_{3,4} > a_G$$

the count rate R1 applies. With a low acceleration (or greater deceleration) the count rate R2 applies. In one embodiment of the present invention, $a_G = -(0.7 \text{ g to } 1 \text{ g})$ applies.

Further, it can be seen from flow chart 2 that the counter R1, R2 is reset in step 13 when the condition $$v_{min} > k \times v_{max}$$

is not satisfied, or when the count $Z_G$ in step 11 is not reached.

The diagrams in the FIG. 3 embodiment are used to explain the described conditions and the sequence run of the method of the present invention. FIG. 3A illustrates the operation of the counters with the count rates R1 and R2 by which the predefined time intervals T1, T2 are achieved. The count limit value $Z_G$ is achieved after 250 msec with count rate R1, but only after 400 msec with count rate R2. This is only an example of embodiment.

According to the FIG. 3B embodiment, the maximum and minimum wheel speed $v_{max}$ and $v_{min}$ differ only to a relatively small extent over a long period of time. The counter with count rate R1 is activated at time $t_0$, see FIG. 3C. At time $t_1$, the change in acceleration or the greater deceleration of the $v_{min}$-wheel results in a transition to the count rate R2. At time $t_2$, the relation $$v_{min} < k \times v_{max}$$

k=0.96 . . . 0.97 applies. Consequently, the counter is reset by the operator 13 at time $t_2$ because the answer to the query 7 (FIG. 2) is 'no'. Counting of the count rate R1 is re-started at time $t_2$. The final count $Z_G$ is reached at time $t_3$, with the result that pressure increase in the front-wheel brakes is initiated. The special program is thus completed. The program run illustrated will restart.

Thus, according to the present invention, the braking effect is improved in a very simple manner by introducing additional braking pressure in a transition condition where all wheels rotate at almost the same speed with a moderate braking effect.

What is claimed is:

1. Method of improving the control behavior of a brake system with anti-lock control in a two-axle vehicle with front wheels and rear wheels, each provided with a wheel brake, wherein the rotational behavior of the wheels is measured and evaluation and logical combining of wheel rotational speed data permits producing a vehicle reference speed, wheel slip data and wheel acceleration data and other control parameters which are used to proportion and modulate a braking pressure, wherein the lowest wheel speed is continuously compared with the highest wheel speed during a braking operation, wherein, if a correlation occurs, at least by approximation, between the lowest and the highest wheel speed and if the correlation lasts longer than a predefined time interval, the pressure in the wheel brakes of the front wheels is permitted to increase or caused to increase after this time interval.

2. Method as claimed in claim 1, wherein the braking pressure in the front-wheel brakes is increased by opening inlet valves which are inserted in a pressure fluid path from a master cylinder of the brake system to the brakes of the front wheels.

3. Method as claimed in claim 1, wherein the braking pressure is increased by raising the value of the vehicle reference speed.

4. Method as claimed in claim 1, wherein the predefined time interval is varied as a function of the acceleration of non-driven wheels, and the predefined time interval is set to a small value as long as the acceleration of all non-driven wheels is in excess of a predetermined limit value which is in the order of 0.5 g to −1 g, and is set to a longer duration when the acceleration is lower, i.e. when the deceleration is greater.

5. Method as claimed in claim 4, wherein the predefined time interval is varied in several steps, and the duration of the predefined time intervals rises with decreasing acceleration, i.e. greater deceleration.

6. Method as claimed in claim 1, wherein counters are used having count rates which predefine the time intervals, and a count rate in the order between 100 msec and 300 msec is preset at high wheel accelerations in excess of the limit value, and a count rate in the order between 300 msec and 500 msec is preset at lower accelerations, i.e. greater decelerations.

7. Method as claimed in claim 6, wherein the counters are reset as soon as the lowest wheel speed exceeds a predetermined limit value.

8. Method as claimed in claim 1, wherein a limit value for the lowest wheel speed of 95 to 98% of the highest wheel speed is preset and wherein an approximation in excess of this limit value of the lowest wheel speed to the highest wheel speed is assessed as approximate correlation.

\* \* \* \* \*